United States Patent Office 3,201,497
Patented Aug. 17, 1965

3,201,497
ADHESIVES COMPRISING EPOXY-HYDROXY POLYETHER RESIN AND EPOXY-CONTAINING COPOLYMER
Walden L. Heino, Grand Island, N.Y., assignor to E. I. du Pont de Nemours and Company, Wilmington, Del., a corporation of Delaware
No Drawing. Filed Sept. 28, 1961, Ser. No. 141,316
8 Claims. (Cl. 260—837)

This invention relates to adhesive compositions and in particular to improved epoxy resin adhesive compositions for metals.

Epoxy resins have found increasing use in compositions for coating, molding, embedding, laminating and adhesive bonding. In most of these applications it is preferable to employ curing agents for these resins. Such cured systems, however, are often somewhat brittle and therefore of limited utility. Brittleness is especially undesirable in structural adhesive compositions because it causes poor resistance to the various peel, tear and cleavage stresses which are almost always present under conditions of use. It is therefore customary to incorporate various flexibilizers in such compositions. The reactive flexibilizers are preferred over inert materials because the latter tend to separate out during the cure and on subsequent aging. Widely used reactive flexibilizers include (1) thermoplastic polyamide resins obtained, for example, by condensation of dimerized and trimerized unsaturated fatty acids with aryl or alkyl polyamines; (2) long chain alkyl diamines; (3) long chain polyesters such as obtained by reacting adipic acid with glycerine; and (4) mercaptan-terminated polysulfides. While epoxy resins containing these known flexibilizers are useful adhesive compositions, they do not provide the maximum adhesive strength obtainable.

It is accordingly an object of this invention to provide improved adhesive compositions. Another object is to provide a new reactive flexibilizer for epoxy resins. A further object is to provide improved epoxy resin adhesives for bonding metals. A still further object is to provide metal adhesives especially useful for bonding stainless steel foil to a carbon steel substrate. Other objects will be apparent from the following description of the invention.

These objects are attained by the new compositions of this invention which comprise an epoxy resin, a copolymer of an ethylenically unsaturated epoxy monomer and an ethylenically unsaturated epoxy-free monomer, and a curing agent for the epoxy resin. The copolymer functions as a reactive flexibilizer for the epoxy resin and provides a surprising enhancement of the adhesive strength obtainable with epoxy resins.

The epoxy resins employed in this invention can be any of the types described in Lee and Neville, "Epoxy Resins," McGraw-Hill Book Company, New York, 1957, Chapter 1. Both solid and liquid types, with molecular weights in the range of about 100 to 5,000, can be used. The term epoxy resin when used throughout this specification and the appended claims is intended to have its broad, art-recognized meaning.

The preferred epoxy resins for use in this invention are the complex epoxy-hydroxy polyethers which are obtained by the catalyzed condensation of polyhydric phenols or alcohols with an epoxy-contributing compound such as epihalohydrins and alkylene oxides as described in U.S. Patents 2,456,408 and 2,592,560. Typical polyhydric phenols include the mononuclear phenols such as resorcinol, catachol and hydroquinone and the polynuclear phenols such as bis-(4-hydroxyphenyl) methane, 2,2-bis-(4-hydroxyphenyl) propane (also known as bisphenol A) and 2,2-bis-(4-hydroxy-2-methylphenyl) propane. Typical polyhydric alcohols include ethylene glycol, glycerine and trimethylol propane. Epichlorohydrin is the preferred epoxy-contributing compound.

Particularly preferred epoxy resins are those obtained by the reaction of bisphenol A and epichlorohydrin. The formula of these materials may be expressed as follows:

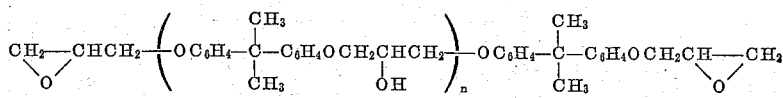

where $n$ has an average value from 0 to about 10. Generally, $n$ will be no greater than 2 or 3, and is preferably 0 or 1.

The copolymers used in this invention contain at least one polymerized ethylenically unsaturated epoxy monomer and at least one polymerized ethylenically unsaturated epoxy-free monomer. Examples of suitable epoxy monomers include but are not limited to the following: allyl glycidyl ether, glycidyl methacrylate, glycidyl acrylate, vinyl glycidyl phthalate, allyl glycidyl phthalate, butadiene monoepoxide, isoprene monoepoxide, divinyl benzene monoepoxide and vinyl cyclohexene monoepoxide. Glycidyl methacrylate is a preferred epoxy monomer because of its ease of polymerization to high molecular weight products. Allyl glycidyl ether is another preferred epoxy monomer. In the preparation of the copolymers used in this invention, the epoxy monomer polymerizes by addition polymerization through the ethylenically unsaturated group leaving the epoxy group

intact and attached directly or indirectly to the carbon backbone of the copolymer at intervals along the copolymer chain. The epoxy group is attached directly to the carbon backbone of the copolymer with certain epoxy monomers such as butadiene monoepoxide and isoprene monoepoxide; while with most other epoxy monomers, for example, glycidyl methacrylate, allyl glycidyl ether and divinyl benzene monoepoxide, the epoxy group is attached indirectly to the carbon backbone through intermediate oxygen and/or carbon atoms.

The ethylenically unsaturated epoxy-free monomers which can be used include but are not limited to the following: acrylate and methacrylate esters of $C_1$ to $C_{18}$ alcohols such as methyl methacrylate, ethyl acrylate, butyl methacrylate and lauryl methacrylate; vinyl esters of $C_1$ to $C_{18}$ aliphatic monocarboxylic acids, such as vinyl acetate, vinyl propionate and vinyl stearate; styrene and substituted styrenes; acrylonitrile, vinyl chloride; vinylidene chloride; ethylene; and dienes such as butadiene and isoprene. Epoxy-free monomers containing hydroxyl, amino, or carboxyl groups, for example, β-hydroxyethyl methacrylate, β-dimethylaminoethyl methacrylate, and acrylic acid may also be used; but since these groups react with epoxy groups, the copolymers should be prepared and stored under conditions which are known to retard or inhibit premature reaction between these groups.

From the foregoing it is apparent that a wide variety of epoxy monomers and epoxy-free monomers can be used and the precise combination of these monomers in the copolymer is not critical. The copolymer should, however, be a film-forming material and have a molecular weight of at least 2,000. In order for the copolymer to be an effective flexibilizer for epoxy resins, the elongation at break of a film of the copolymer should be at least 10% when measured at 25° C. by the standard techniques known in the art. The epoxy or oxirane oxygen content of the copolymer will range from 0.033 to 7% by weight. For example, a 1/1 ethyl acrylate/allyl glycidyl ether copolymer will contain 7.1% by weight of oxirane oxygen which is about the maximum useful content for use in the compositions of this invention.

The relative amounts of epoxy resin and epoxy copolymer in the compositions depend on the flexibilizing effect and oxirane oxygen content of the epoxy copolymer. The operable ranges of these two ingredients to obtain adequate flexibilizing are 70 to 98 parts epoxy resin and 30 to 2 parts epoxy copolymer. This corresponds to about 2 to about 45% by weight of epoxy copolymer based on the epoxy resin. The oxirane oxygen content of the copolymer should be sufficient to supply 0.01 to 2% by weight oxirane oxygen to the epoxy resin-epoxy copolymer composition. At the lowest level of epoxy copolymer, 2 parts per 98 parts of epoxy resin, the epoxy copolymer should contain a minimum of 0.5% by weight of oxirane oxygen. At the highest level of epoxy copolymer, 30 parts per 70 parts of epoxy resin, the epoxy copolymer can contain as little as 0.033% and as much as about 7% by weight of oxirane oxygen.

Epoxy copolymers which are preferred because of their effective flexibilizing action, excellent hydrolytic stability and remarkable adhesion-promoting effect are copolymers of 40 to 70% by weight of methyl methacrylate, 25 to 55% by weight of ethyl acrylate and 3 to 30% by weight of glycidyl methacrylate. These preferred copolymers contain 0.34 to 3.4% by weight of oxirane oxygen. Another class of preferred epoxy copolymers contains 3 to 20% by weight of allyl glycidyl ether and 97 to 80% by weight of a monomer selected from the group consisting of vinyl acetate and ethyl acrylate. These copolymers contain 0.42 to 2.8% by weight of oxirane oxygen. These two classes of preferred copolymers can be readily made in molecular weights in excess of 2,000 and have elongations at break of 10% or greater.

A curing agent for the compositions of this invention is required to convert them to crosslinked and insoluble adhesives. The choice of the specific curing agent is not critical and any of the well-known curing agents for epoxy resins can be used. These include both acidic and basic materials. The curing agent can function by catalytic action or can actually react with the epoxy resin to cause crosslinking. Examples of catalytic agents are tertiary amines such as triethylamine, benzyldimethylamine and pyridine, and cyclic aliphatic amines such as piperidine. Crosslinking agents include the polyfunctional primary and secondary amines such as diethylenetriamine, triethylenetetramine, diethylaminopropylamine, adducts of such polyfunctional amines with ethylene oxide, and dibasic acids and acid anhydrides such as oxalic acid and phthalic anhydride. Latent curing agents such as dicyandiamide and boron trifluoride-amine complexes can also be used. The amounts of curing agents used depend on their type as is well-known in the art. Thus with the crosslinking type of agent there is a calculated optimum or stoichiometric ratio which at least theoretically will provide for complete consumption of the reactive groups in the epoxy resin and epoxy copolymer. The actual amount used in practice is then modified by evaluation of the performance and properties to obtain the optimum result. With the catalytic type of curing agent, the optimum percentages must be determined experimentally for each system.

The invention is further illustrated by the following examples in which all percentages and parts are on a weight basis.

PREPARATION OF EPOXY COPOLYMER A

In a polymerization kettle equipped with a stirrer and reflux condenser were placed 420 parts methyl methacrylate, 246 parts ethyl acrylate, 54 parts glycidyl methacrylate, 720 parts benzene as solvent, and 7.2 parts benzoyl peroxide as polymerization initiator. The mixture was heated at 84–85° C. for 2¼ hours. The solvent and unreacted monomers were removed by steam distillation and the solid product then dissolved in acetone. The acetone was allowed to evaporate at room temperature and the final traces then removed in a vacuum oven at 70° C. The colorless polymeric solid (680 parts; 94.6% conversion) contained 6.2% glycidyl methacrylate and had an inherent viscosity of 0.60 (0.5% concentration in benzene at 25° C.). The overall composition of the copolymer was 60/34/6 methyl methacrylate/ethyl acrylate/glycidyl methacrylate.

The polymer can also be isolated from the polymerization mixture by removing the benzene and unreacted monomers under reduced pressure.

PREPARATION OF EPOXY COPOLYMER B

The procedure used in the preparation of copolymer A was followed using 396 parts methyl methacrylate, 238 parts ethyl acrylate, 158 parts glycidyl methacrylate, 792 parts benzene as solvent, and 8 parts benzoyl peroxide as polymerization initiator. The mixture was heated at 84–85° C. for 4¾ hours and the copolymer isolated as before. The colorless polymeric solid (760 parts; 96.4% conversion) contained 18.3% glycidyl methacrylate and had an inherent viscosity of 0.70 (0.5% concentration in benzene at 25° C.). The overall composition of the copolymer was 51/31/18 methyl methacrylate/ethyl acrylate/glycidyl methacrylate.

The commercial epoxy resins used in the Examples are liquid reaction products of about 1 mole of bisphenol A and with about 2 moles of epichlorohydrin. Their properties are summarized below:

| Epoxy Resin | Epoxide Equivalent | Average Molecular Weight | Viscosity at 25° C., Centipoises |
|---|---|---|---|
| I | 175–210 | 350–400 | 5,000–15,000 |
| II | 175–210 | 350–400 | 500–900 |

Epoxy resin II contains a small amount of a reactive diluent (e.g., butyl glycidyl ether) to reduce its viscosity.

*Example 1*

Epoxy copolymer B was evaluated as an adhesive by the following procedure. Sixteen-gauge 302 stainless steel strips (#3 finish), 1″ x 4″, were cleaned by the following sequence of operations: vapor degrease, alkaline soak, rinse, HCl dip (3–5 seconds), rinse, chromic acid soak, rinse, oven dry. The cleaned strip was then coated at one end with copolymer B deposited from a 25% solution in methyl ethyl ketone. The solvent was allowed to evaporate and the strips then assembled to standard ½″ lap joints (ASTM D1002–53T) and heated in a press to effect bond formation. Testing according to ASTM D1002–53T showed lap shear strengths in the range 490–720 p.s.i.; average, 600 p.s.i. Failure was cohesive in the copolymer.

This experiment was repeated adding a stoichiometric amount (based on oxirane oxygen content of copolymer B) of triethylenetetramine (TETA) to the methyl ethyl ketone solution of the copolymer. A slight increase in lap seal strength was obtained: 640–920 p.s.i.; average, 740 p.s.i. The failure was adhesive.

Since structural adhesives are generally considered to require minimum lap shear strengths of 1,000–1,500 p.s.i., the copolymer alone is not a suitable adhesive for this purpose.

Example 2

Solutions of varying amounts of epoxy copolymer B in epoxy resin I were prepared by mixing acetone solutions of the constituents and then removing the acetone by evaporation. One gram of TETA was added to 10 grams of the solution. This corresponds to 10 phr. (10 parts per hundred parts of combined epoxy resin and epoxy copolymer). After mixing and deaerating, this adhesive composition was applied to the ends of 1" x 4", 16 gauge 302 stainless steel strips (#3 finish) previously cleaned by the procedure in Example 1. Standard ½" lap joints were then assembled, clamped lightly in a bonding jig to maintain joint alignment, and heated for 30 minutes at 80° C., then 90 minutes at 120° C. to cure the adhesive. After cooling to room temperature, the joints were tested according to ASTM D1002–53T. The results are summarized below:

| Epoxy Resin-Epoxy Copolymer Composition | | Joint Strength (p.s.i.) | | Type of Break |
|---|---|---|---|---|
| Percent Epoxy Resin I | Percent Epoxy Copolymer B | Range | Average | |
| 100 | 0 | 1,480–2,000 | 1,640 | Adhesive. |
| 100 | 0 | 1,640–1,820 | 1,740 | Do. |
| 99 | 1 | 1,540–1,930 | 1,730 | Do. |
| 95 | 5 | 3,280–3,800 | 3,480 | Do. |
| 95 | 5 | 2,860–3,500 | 3,250 | Do. |
| 90 | 10 | 2,920–4,200 | 3,330 | Cohesive. |
| 90 | 10 | 3,140–3,540 | 3,300 | Cohesive. Adhesive. |

These results indicate that 1% epoxy copolymer does not give sufficient flexibilizing action to provide a significant increase in joint strength. A minimum of 2% epoxy copolymer is required for significant flexibilizing and adhesion-promotion.

Experiments in which the amount of curing agent (TETA) was varied from 8–12 phr. indicated that 10 phr. gave optimum cure with epoxy resin-epoxy copolymer mixtures containing about 5–10% epoxy copolymer.

Example 3

For comparison with the adhesive strengths obtained in Example 2, epoxy resin I was combined with a commercial polyamide type flexibilizer-curing agent for evaluation as a metal adhesive. Following the recommendations of the supplier of the polyamide flexibilizer, a 70:30 ratio of epoxy resin I to polyamide flexibilizer was used. The cleaning, joining and testing procedures used in Example 2 were followed. Joint strengths were in the range of 2130–2420 p.s.i.; average, 2280 p.s.i. The failure was adhesive.

For further comparison, a commercial one-component epoxy adhesive in paste form was tested by the method of Example 2 except that curing was effected by heating for 120 minutes at 150° C. This is the cure schedule recommended by the adhesive manufacturer. Joint strengths were in the range 1710–3250 p.s.i.; average, 2380 p.s.i. The failure was cohesive.

Example 4

An adhesive composition containing 95% epoxy resin I and 5% epoxy copolymer B in combination with 10 phr. TETA was tested with 0.050" aluminum (7075–T6) strips previously cleaned by the following sequence of operations: vapor degrease, soak in $H_2SO_4$—$Na_2Cr_2O_7$ solution, rinse, oven dry. The joining, curing and testing procedures of Example 2 were followed. Joint strengths were 3720–5310 p.s.i.; average, 4700 p.s.i. The failure was adhesive.

Example 5

The adhesive composition of Example 4 was used in making standard lap joints with previously cleaned 16 gauge cold-rolled steel (1020; #4 finish). The cleaning operation included the following steps: soak in trichloroethylene to remove excess protective oil, vapor degrease, alkaline soak, rinse, HCl dip, rinse, immersion in $H_2SO_4$—$H_2C_2O_4$ solution, rinse, oven dry. The joining, curing and testing procedures of Example 2 were followed. Joint strengths were 3200–3460 p.s.i.; average, 3390 p.s.i. The failure was chiefly within the metal oxide surface layer formed during cleaning.

Example 6

An adhesive composition containing 90% epoxy resin I and 10% epoxy copolymer A in combination with 10 phr. TETA was used to bond stainless steel strips as in Example 2. Joint strength were in the range 3160–3560 p.s.i.; average, 3420 p.s.i.

Example 7

Following the procedure of Example 2, adhesive compositions based on epoxy resin II and epoxy copolymer B were prepared with 10 phr. TETA, based on the combined epoxy resin and epoxy copolymer. Stainless steel strips were bonded and the joint strengths determined by the procedures of Example 2. The results are summarized below:

| Epoxy Resin-Epoxy Copolymer Composition | | Joint Strength (p.s.i.) | | Type of Break |
|---|---|---|---|---|
| Percent Epoxy Resin II | Percent Epoxy Copolymer B | Range | Average | |
| 100 | 0 | 2,250–2,610 | 2,400 | Adhesive. |
| 90 | 10 | 3,460–3,920 | 3,610 | Do. |

For comparison, an adhesive containing 70 parts of epoxy resin II and 30 parts of a commercial polyamide type flexibilizer (same as used in Example 3) gave shear strengths in the range 2500–2970 p.s.i.; average, 2760 p.s.i. The failure was adhesive.

Example 8

The cleaning procedure described in Example 1 was modified to include a 5 minute immersion in HCl in place of the HCl dip. Stainless steel strips so cleaned were bonded with various adhesives and the joint strengths determined by the procedure of Example 2. The results are summarized below.

| Adhesive | Joint Strength (p.s.i.) | | Type of Break |
|---|---|---|---|
| | Range | Average | |
| 90/10 Epoxy resin II/Epoxy copolymer B+10 phr. TETA. | 5,120–5,320 | 5,220 | Cohesive. |
| 70/30 Epoxy resin II/ commercial polyamide flexibilizer. | 1,980–2,250 | 2,120 | Adhesive. |
| Commercial one-component epoxy in paste form (Same as in Example 3). | 1,860–2,800 | 2,340 | Cohesive. |
| Epoxy resin II+10 phr. TETA | 2,700–3,200 | 2,860 | Adhesive. |

Example 9

A vinyl acetate/allyl glycidyl ether (VAc/AGE) copolymer containing 16% by weight of polymerized allyl glycidyl ether and having an inherent viscosity of 0.13 (0.5% concentration in benzene at 25° C.) was prepared according to U.S. Patent 2,788,339.

Following the procedure of Example 2, adhesive compositions based on epoxy resin I and the above VAc/AGE copolymer were prepared with 10 phr. TETA, based on the combined epoxy resin and epoxy copolymer. Stainless steel strips were bonded and the joint strengths determined by the procedures of Example 2. The results are summarized below.

| Epoxy Resin-Epoxy Copolymer Composition | | Joint Strength (p.s.i.) | |
|---|---|---|---|
| Percent Epoxy Resin I | Percent VAc/AGE | Range | Average |
| 95 | 5 | 3,860–3,980 | 3,940 |
| 90.5 | 9.5 | 3,320–3,500 | 3,420 |

*Example 10*

An ethyl acrylate/allyl glycidyl ether (EA/AGE) copolymer containing 6.6% by weight of polymerized allyl glycidyl ether and having an inherent viscosity of 0.39 (0.5% concentration in benzene at 25° C.) was prepared according to U.S. Patent 2,687,405.

An adhesive composition containing 5% of the above EA/AGE copolymer and 95% of epoxy resin II with 10 phr. TETA based on the combined epoxy copolymer and epoxy resin, was prepared by mixing benzene solutions of the constituents and then removing the benzene by evaporation. Stainless steel strips were then bonded and the joint strengths determined by the procedures of Example 2. The joint strengths were in the range of 3050–3240 p.s.i.; average, 3150 p.s.i.

*Example 11*

A laminate of 8 mil stainless steel (type 302) foil bonded to a 10 mil carbon steel substrate was prepared with an adhesive composed of 90% epoxy resin II and 10% epoxy copolymer B in combination with 10 phr. TETA. The adhesive was applied to the carbon steel and the bonding then carried out under pressure (25–60 p.s.i.) using the following curing conditions: 60 minutes at 120° C. The laminate so prepared had good formability without delamination was readily buffed to a high finish without harm to the adhesive layer and exhibited excellent corrosion resistance.

In order to obtain good formability and corrosion resistance in the composite laminated structure, the stainless steel foil should be at least 0.5 mil thick and should have a composition within the range 11 to 27% chromium, 0 to 20% nickel and the balance predominantly iron.

The foregoing examples have illustrated the use of the adhesive compositions of this invention for bonding stainless steel, cold-rolled steel, carbon steel, and aluminum. The adhesives are also valuable for bonding other metals and alloys, for example, copper, magnesium, chromium, and brass.

The adhesive compositions of this invention may contain up to 100 parts or more of filler per hundred parts of combined epoxy resin and epoxy copolymer. Typical fillers are asbestos, mica, talc, silica, alumina, carbon black, aluminum powder, iron powder and zinc dust.

In addition to their uses as adhesives, the compositions of this invention are also valuable in other applications where adherence to metals is required, for example, in protective or decorative coatings.

The embodiments of the invention in which an exclusive property or privilege is claimed are defined as follows:

1. An adhesive composition comprising an 1,2-epoxy-hydroxy polyether; 2 to 45% by weight, based on said 1,2-epoxy-hydroxy polyether, of a film-forming copolymer of an ethylenically unsaturated 1,2-epoxy monomer and at least one ethylenically unsaturated 1,2-epoxy-free monomer, said copolymer having a molecular weight of at least 2,000, an elongation at break of at least 10%, and an oxirane oxygen content of 0.033 to 7% by weight; and a curing agent for said 1,2-epoxy-hydroxy polyether.

2. An adhesive composition as set forth in claim 1 wherein the 1,2-epoxy-hydroxy polyether is represented by the formula:

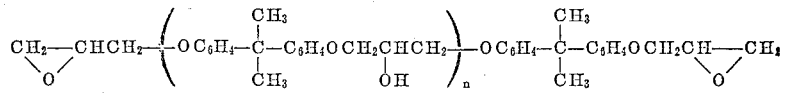

where $n$ has an average value from 0 to about 10.

3. An adhesive composition as set forth in claim 1 wherein the ethylenically unsaturated 1,2-epoxy monomer is glycidyl methacrylate.

4. An adhesive composition as set forth in claim 1 wherein the ethylenically unsaturated 1,2-epoxy monomer is allyl glycidyl ether.

5. An adhesive composition as set forth in claim 1 wherein the film-forming copolymer is a copolymer of 40 to 70% by weight of methyl methacrylate, 25 to 55% by weight of ethyl acrylate and 3 to 30% by weight of glycidyl methacrylate.

6. An adhesive composition as set forth in claim 1 wherein the film-forming copolymer is a copolymer of 97% to 80% by weight of a monomer selected from the group consisting of vinyl acetate and ethyl acrylate and 3 to 20% by weight of allyl glycidyl ether.

7. An adhesive composition as set forth in claim 1 wherein the ethylenically unsaturated 1,2-epoxy monomer is a member of the group consisting of glycidyl methacrylate and allyl glycidyl ether.

8. An adhesive composition comprising an 1,2-epoxy hydroxy polyether; 2 to 45% by weight, based on said 1,2-epoxy-hydroxy polyether, of a film-forming copolymer of an ethylenically unsaturated 1,2-epoxy monomer and at least one ethylenically unsaturated 1,2-epoxy-free monomer, said copolymer having a molecular weight of at least 2,000, an elongation at break of at least 10%, and an oxirane oxygen content of 0.033 to 7% by weight, the amount of said copolymer being sufficient to supply 0.01 to 2% by weight oxirane oxygen to the 1,2-epoxy-hydroxy polyether epoxy copolymer composition; and a curing agent for said 1,2-epoxy-hydroxy polyether.

References Cited by the Examiner

UNITED STATES PATENTS

| 2,609,355 | 9/52 | Winkler | 260—837 |
| 2,633,458 | 3/53 | Shokal | 260—837 |
| 2,848,433 | 8/58 | Eirich | 260—837 |
| 2,992,132 | 7/61 | Melamed | 260—837 |
| 3,014,890 | 12/61 | Bradley et al. | 260—837 |
| 3,052,659 | 9/62 | Woodruff | 260—828 |
| 3,100,160 | 8/63 | Korpman | 260—829 |
| 3,105,826 | 10/63 | Jaggard | 260—837 |

MURRAY TILLMAN, *Primary Examiner.*

LEON J. BERCOVITZ, WILLIAM H. SHORT,
*Examiners.*